Patented Jan. 21, 1936

2,028,233

UNITED STATES PATENT OFFICE 2,028,233

WELDING

Maurice Naëder, Paris, France

Application March 14, 1935, Serial No. 11,008
In Germany March 20, 1934

1 Claim. (Cl. 113—112)

In welding with the electric arc having a carbon electrode or in welding with the oxy-acetylene torch, the welding metal is generally placed in position in the form of a strip prepared beforehand, and which is held in position between the two parts to be welded. In order to position the metal welding strip, and to hold it during the operation, it is fixed by a few spot welds. The fixation and the spot welding beforehand of a simple welding strip which cannot be attached to the joint, are extremely difficult, awkward and delicate, and they require a great deal of time. Furthermore the strip which is not fixed along its whole length has always a tendency during the welding operation to become removed or separated from the joint owing to the internal stresses of the strip or to the stresses caused by the heat; the weld is therefore delicate to make and any displacement of the strip which is not corrected renders such weld defective. Furthermore the spot welds often give rise to defects in the weld such as lack of fluid tightness, flaws, irregularities, etc.

Finally, in welding with the electric arc, it is necessary to support the joint from underneath, in general by means of a copper bar. The use of such bar has caused the greatest difficulties in the construction of electric arc welding devices, and has compelled the manufacturers to have recourse to hydraulic or pneumatic devices which are very costly and complicated to manipulate.

In order to avoid this drawback, it has already been proposed to give the welding strip an H-shaped cross-section, the web portion of which runs through the joint of the two metal sheets and the two legs of which fit over both sides of the metal sheets which are to be butt-welded. But this method gives rise, however, to further drawbacks, since it is difficult and tedious to successively fit into the two hollows of the H the two edges of the metal sheets which necessarily have differences in thickness and non-symmetrical differences of level on the two metal sheets to be welded. It is often necessary, in order to obtain this result, to use very rugged fixing devices, which considerably increases the cost of the weld.

It has also been proposed to use a single welding strip of U-shaped cross-section in order to weld a single metal sheet edgewise in a groove of another metal sheet perpendicular to the first one. In this case, the specially provided groove had a perfectly definite and regular shape, and the welding operation did not therefore offer the difficulties of butt-welding metal sheets which are always irregular. In this method a single U-shaped welding strip was sufficient, but this solution would be impracticable for butt-welding two metal sheets, since the edges of same are necessarily irregular (irregularities in the three dimensions).

The object of the invention is to provide a method whereby the drawbacks referred to above in the butt-welding of parts are overcome. For this purpose, the method according to the invention consists in placing welding strips of U-shaped cross-section astride on each of the edges of the parts to be welded, moving said parts towards each other until the welding strips abut, and then performing the welding operation.

Other advantages and peculiarities of the invention will become apparent from the ensuing description made with reference to the accompanying drawing, in which:

Figs. 8 and 9 show other ways of using the method.

Figure 1:
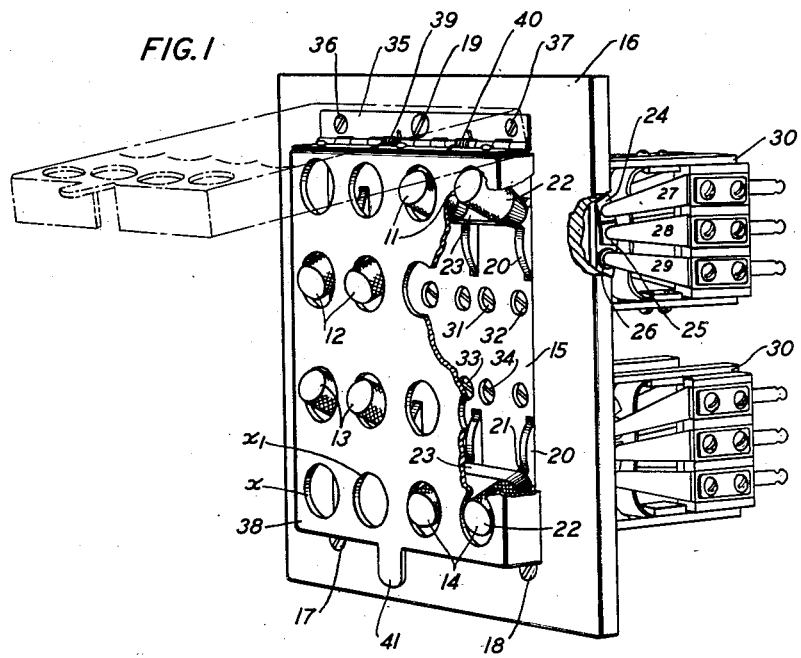
Fig. 1 shows in transverse section and by way of example, the U-shaped welding strip serving for the application of the method according to the invention.

As stated above, the welding strip is obtained for example by rolling or drawing, so as to give it a U-shaped cross-section, preferably such as shown in section in Fig. 1.

Figure 2:
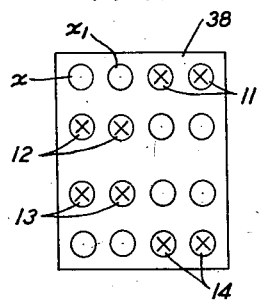
Figs. 2, 3 and 6 show in cross-section two methods of making welds according to the invention.
Figure 3:
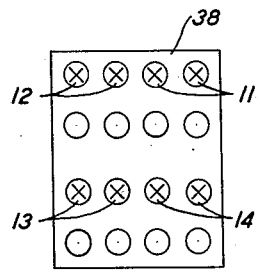
Figure 4:
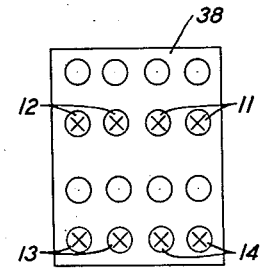
Figs. 4 and 5 show in perspective other methods of carrying out the object of the invention.
Figure 5:
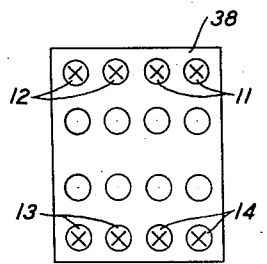
Figure 6:
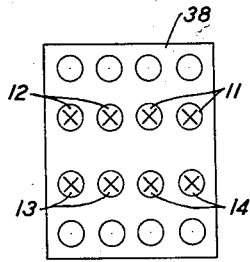
Figure 7:
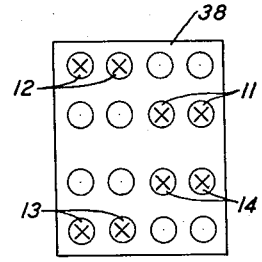
Fig. 7 shows a form of construction of the U-shaped strip other than that of Fig. 1.

In Fig. 2 the application of the strip has been shown for welding together two hemispheres, in Fig. 3 for welding together two pipe sections, in Fig. 4 for welding the two edges of a pipe obtained for example by bending a sheet of metal, in Fig. 5 for welding metal sheets together so as to form a continuous assembly and finally, in Fig. 6, for welding on the end of a cylindrical part, a closure obtained by pressing for example. In each of these examples two sections of strip are used for welding having the cross-section according to Fig. 1, and each of such sections of strip fits on to one of the parts to be joined by welding. The cross-section of the strip is such that the strip 1 fits exactly on to the edge of the parts to be welded, and that it remains so fitted while the two parts are moved towards each other. The two strips which then abut against each other remain in position whatever may be the mechanical or thermic stresses which may subsequently be exerted on said strips.

Jan. 21, 1936. H. G. OCH 2,028,237

LOCKING DEVICE

Filed Jan. 31, 1934

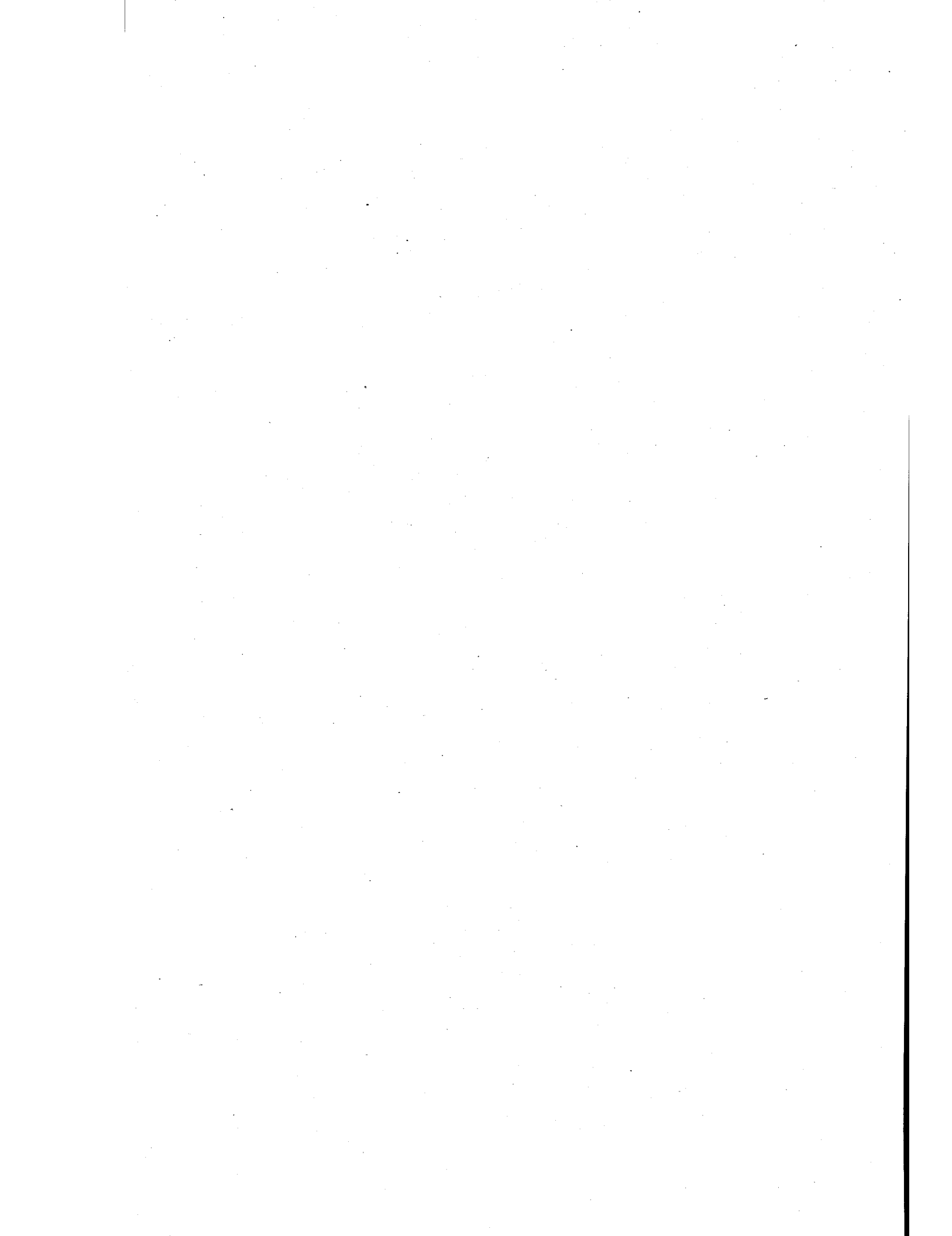

INVENTOR
H.G.OCH
BY J. MacDonald
ATTORNEY